(12) United States Patent
Mendes

(10) Patent No.: US 11,800,888 B2
(45) Date of Patent: Oct. 31, 2023

(54) JUICE EXTRACTION MACHINE

(71) Applicant: Carlos Mendes, Araraquara-SP (BR)

(72) Inventor: Carlos Mendes, Araraquara-SP (BR)

(*) Notice: Subject to any disclaimer, the term of this patent is extended or adjusted under 35 U.S.C. 154(b) by 327 days.

(21) Appl. No.: 16/984,082

(22) Filed: Aug. 3, 2020

(65) Prior Publication Data

US 2021/0045425 A1 Feb. 18, 2021

Related U.S. Application Data

(63) Continuation of application No. 15/305,812, filed as application No. PCT/IB2015/052482 on Apr. 6, 2015, now Pat. No. 10,729,165.

(30) Foreign Application Priority Data

Apr. 22, 2014 (BR) ...................... BR1020140095942

(51) Int. Cl.
*A23N 1/00* (2006.01)
*A47J 19/02* (2006.01)
*A23N 1/02* (2006.01)

(52) U.S. Cl.
CPC ................. *A23N 1/02* (2013.01); *A23N 1/00* (2013.01)

(58) Field of Classification Search
CPC .................................. A23N 1/003; A47J 19/02
See application file for complete search history.

(56) References Cited

U.S. PATENT DOCUMENTS

| | | | | |
|---|---|---|---|---|
| 1,116,604 A | * | 11/1914 | McDonald ........... | B65D 47/286 |
| | | | | 220/348 |
| 1,256,437 A | * | 2/1918 | Careaga ................. | A45C 11/02 |
| | | | | 229/122 |
| 1,920,485 A | * | 8/1933 | Silver ....................... | B65F 3/04 |
| | | | | 414/487 |

(Continued)

*Primary Examiner* — Helena Kosanovic
*Assistant Examiner* — Lawrence H Samuels
(74) *Attorney, Agent, or Firm* — Accel IP Law, PLLC; Ferdinand M. Romano

(57) ABSTRACT

Improvements to a juice extraction machine, particularly a commercial-scale fruit juice extraction machine that is extremely light and compact for very easy handling and transportation, which is noteworthy for its unusual construction configuration that includes, among other items, a swing-lidded waste-bin on its front whose walls are close to the peeler cups when closed, allowing easy removal of wastes such as pith, pulp and peel when open. The invention comprises a fruit-rack sub-set (1) with a curved concave cross-section whose movement is synchronized with the axle (51) that powers the mobile peeler (2), such fruit-rack (1) being attached to the mobile peeler sub-set (2) through slots (3) and with the machine including a cross-spring (4) attached at the bottom of the feeder/dispenser pipe (5), with such cross-spring (4) having a means of activation (6) located on the fruit-rack sub-set (1); the improved machine (M) comprises a swing-lidded waste-bin (7) on its front part, with such swing-lidded waste-bin (7) having substantially semi-circular sides (8) close to the mobile (2) and fixed (2B) peelers and with the mobile peeler (2) connected to a gear-motor sub-set (31) and the fixed peeler (2B) concatenate with the filter and piston sub-set (67) assembled in the fixed peeler (2B).

4 Claims, 20 Drawing Sheets

(56) References Cited

U.S. PATENT DOCUMENTS

| | | | | |
|---|---|---|---|---|
| 2,339,360 A * | 1/1944 | Sicard | B65F 3/28 | 414/501 |
| 2,649,216 A * | 8/1953 | Gollnick | B65F 3/207 | 414/525.54 |
| 2,705,388 A * | 4/1955 | Gokey | A63H 17/06 | 298/1 T |
| 3,593,908 A * | 7/1971 | Desmond | B65D 5/16 | 229/122 |
| 3,747,833 A * | 7/1973 | Robinson | B65D 5/721 | 221/305 |
| 4,310,279 A * | 1/1982 | Johnston | B65F 1/1468 | 414/525.6 |
| 4,506,601 A * | 3/1985 | Ramirez | A47J 19/027 | 99/511 |
| 4,905,586 A * | 3/1990 | Anderson | A23N 1/003 | 100/98 R |
| 5,199,348 A * | 4/1993 | Cimenti | A23N 1/003 | 100/98 R |
| 5,249,516 A * | 10/1993 | Pastor | A23N 1/003 | 99/507 |
| 5,483,870 A * | 1/1996 | Anderson | A23N 1/003 | 100/98 R |
| 5,628,247 A * | 5/1997 | Palumbo | B30B 9/207 | 100/157 |
| 5,655,441 A * | 8/1997 | Mendes | A23N 1/003 | 100/98 R |
| 5,720,219 A * | 2/1998 | Mendes | A23N 1/003 | 100/98 R |
| 5,802,964 A * | 9/1998 | Mendes | A23N 1/003 | 100/98 R |
| 5,957,043 A * | 9/1999 | Font | A23N 1/003 | 99/507 |
| 5,984,134 A * | 11/1999 | Mario | B65F 1/06 | 220/495.11 |
| 7,000,534 B1 * | 2/2006 | Mendes | A23N 1/003 | 100/98 R |
| 7,086,328 B1 * | 8/2006 | Mendes | A23N 1/003 | 100/130 |
| 8,047,130 B2 * | 11/2011 | Neto | A23N 1/003 | 99/510 |
| 9,220,373 B2 * | 12/2015 | Hensel | A47J 43/255 | |
| 9,918,578 B2 * | 3/2018 | Stolk | A23N 1/02 | |
| 2005/0028690 A1 * | 2/2005 | Neto | A23N 1/003 | 100/213 |
| 2007/0056450 A1 * | 3/2007 | Hensel | A47J 43/255 | 99/495 |
| 2008/0250942 A1 * | 10/2008 | Neto | A23N 1/003 | 99/510 |
| 2009/0242567 A1 * | 10/2009 | Forbes | B65F 1/1436 | 220/660 |
| 2009/0301318 A1 * | 12/2009 | Torrisi | A23N 1/003 | 99/503 |
| 2015/0305540 A1 * | 10/2015 | Stolk | A47J 19/02 | 100/98 R |
| 2017/0071245 A1 * | 3/2017 | Stolk | A23N 1/02 | |
| 2018/0086245 A1 * | 3/2018 | Heck | B65D 88/129 | |

* cited by examiner

JUICE EXTRACTION MACHINE

BRIEF INTRODUCTION

This application requests a patent of Invention for IMPROVEMENTS TO A JUICE EXTRACTION MACHINE, particularly an extremely compact commercial-scale fruit juice extraction machine that is extremely easy to handle and transport, being noteworthy for the unusual configuration of its construction that, among other items, is fitted with a swing-lidded waste-bin at the front whose side walls are close to the peeler cups when completely closed, allowing easy waste pith, pulp and peel removal when open. This invention is also noteworthy for a fruit-rack mounted on and connected to the mobile peeler that holds the fruit during the second stage (when the fruit is on the mobile peeler) with this rack being smooth-surfaced and slightly curved (with a broad radius), serving as a waiting stage before the fruit falls onto the peelers, without damaging the fruit and ensuring that it slides easily, in addition to significantly enhancing the efficiency of the machine, which is small compared to others, although highly productive.

FIELD OF APPLICATION

Fruit juice extraction in the commercial sector.

STATE OF THE ART

Since 1995, the inventor has devoted time and attention to the development of fruit juice extractors, filing the first patent application No P19502244-9 for a commercial-scale machine with the following characteristics: a machine developed for processing citrus fruit in general with no manual contact, comprised of a tubular chassis attached to an extraction compartment in which is installed a geared motor rotating a crankshaft that in turn axially revolves one peeler cup against another peeler cup in order to trap the fruit released by a trigger located at the outlet of a fruit tray, with one of the above-mentioned peeler cups having a central shaft and the other a juice extraction perforation pipe, whereby all these solid wastes are discharged into a waste-bin while the liquid runs through a filter, flowing sequentially through a pipe in a horizontal "S" shape.

Within the line of research pursued by the inventor, the technology was improved and an application was filed under No MU7501780-6 for the machine feeder system, describing the steady supply fed into the machine in a synchronized manner through a feeder arm positioned across the feeder outlet, preventing the fruit from moving forward, with this arm lifting as the mobile peeler cup moves towards the static (fixed) peeler cup and allowing a fruit to fall from the container, and so on successively, whereby a fruit falls directly on to the peelers in each cycle.

Progressing with the state of the art, this inventor filed an application under No MU7502884-4, whose purpose was to improve the feeder system even more through introducing a fruit stirrer on the top tray and a new dispensing device fitted with a spiral spring placed across the feeder outlet, allowing only one fruit to fall each time.

Analyzing the indicated state of the art for the line of progression developed by this inventor, the first issue to be addressed with regard to P19502244-9 is the shape and placement of the waste-bin, as with the previous technique it is located very far away from where the extraction occurs. Thus, bearing in mind that the fruit peel, pith and pulp are expelled at random, in addition to the possibility that a piece of fruit may "burst", wastes stick to the sides of the machine under these conditions until reaching the waste-bin. Consequently, in order to remove the wastes from the waste-bin, it is necessary to take it out of the machine. It is even harder to clean the walls surrounding the peelers, especially the walls between such peelers and this waste-bin.

The second issue to be addressed consists of the so-called second stage of the fruit, which is when it is positioned over the mobile peeler, as this consists of blades and its outer shape does not allow the fruit to slide easily during linear movement. In this context, another technical issue noted by the inventor relates to the fruit wastes, which are thrown towards the top part of the machine, as the peeler is hollow.

THIS INVENTION

In order to resolve the issue of the distance of the waste-bin, the inventor designed a surrounding swing-lidded waste-bin that addresses not only the distance factor but also its manner of construction. In this invention, the walls of the surrounding swing-lidded waste-bin are close to the peelers which also means that, in addition to helping resolve the wastes removal problem, the machine is very compact, although highly productive. On the other hand, the side walls of the above-mentioned surrounding swing-lidded waste-bin are semicircular, whereby it can be rotated, thus allowing very easy waste removal.

With regard to the second aspect addressed, meaning the fruit slipping onto the mobile peeler, the inventor introduced a fruit-rack positioned on the outer top side of the mobile peeler, whose movements are linked thereto. This means that the fruit lies on a more suitable smooth surface, particularly as its curved shape has a radius far larger than that of the fruit itself, constituting a tubular structure that releases the fruit. This fruit-rack also serves to deflect wastes, not allowing them to fly upwards and thus keeping the top part of the machine clean.

In other words, when compared to the mentioned documents constituting the state of the art, the most relevant innovations in this invention are related to the parts of the machine arrayed after the dispenser or feeder device, considering the characteristic operating cycle of this type of juice extractor.

With this new machine, according to the invention, it may be said that the fruit runs through three stages, all synchronized by the mobile peeler movements. In the first stage, the fruit lies on a cross spring in the feeder; in the second stage, the fruit falls onto the fruit-rack, released by contact between the spring release devices resulting from the linear movement of the mobile peeler towards the fixed peeler, being held above the mobile peeler by the cross-spring; in the third stage, the fruit falls onto the fixed and mobile peelers, resulting in the fruit being peeled and the juice being extracted.

In more technical terms, this invention places a spiral cross-spring between the feeder pipe and the fruit-rack sub-set that initially holds the fruit in the vertical feeder or dispenser (first stage), with this spring activated through devices inserted in the above-mentioned fruit-rack sub-set that are triggered by the same axle that rotates the mobile peeler, whereby the fruit waiting on the rounded fruit-rack constitutes the second stage, whereby such fruit will be released on to the peeler sub-set only when the fruit movement component on the fruit-rack sub-set touches such fruit during linear movement, allowing it to fall between the peelers for the third stage, which is the act of peeling the fruit and extracting the juice simultaneously. In other words, in an almost simultaneous operation, the spiral cross spring is touched by the spring activators, releasing the fruit lined up in the feeder pipe, which then falls onto the above-mentioned fruit-rack.

Thus, the fruit running through the dispenser falls onto the top part of the mobile peeler and then on to the peeler during the next cycle, when the juice is extracted. Assuming that the dispenser or feeder pipe is full, there will be one fruit at each of the stages in each cycle.

Advantages of the Invention

Among other advantages that are clear from the preceding description, the advantages rated as relevant to this invention may be listed as follows:
  More efficiently synchronized fruit feed as the fruit slips more smoothly over the fruit-rack during the second feeder stage;
  Less damage to the fruit, due to the shape and polished surface of the fruit-rack;
  Keeps the inside of the machine cleaner;
  Easier and more complete cleaning and removal of pith, pulp and peel;
  Machine with a lighter, less complex and more compact structure, requiring fewer parts with lower manufacturing costs.

DESCRIPTION OF THE DRAWINGS

The details of the construction and operation of the invention are set forth below, with the appended drawings disclosing a preferred construction for the machine, which may be altered provided that the scope of the invention is maintained. The Figures are.

Figure 6:
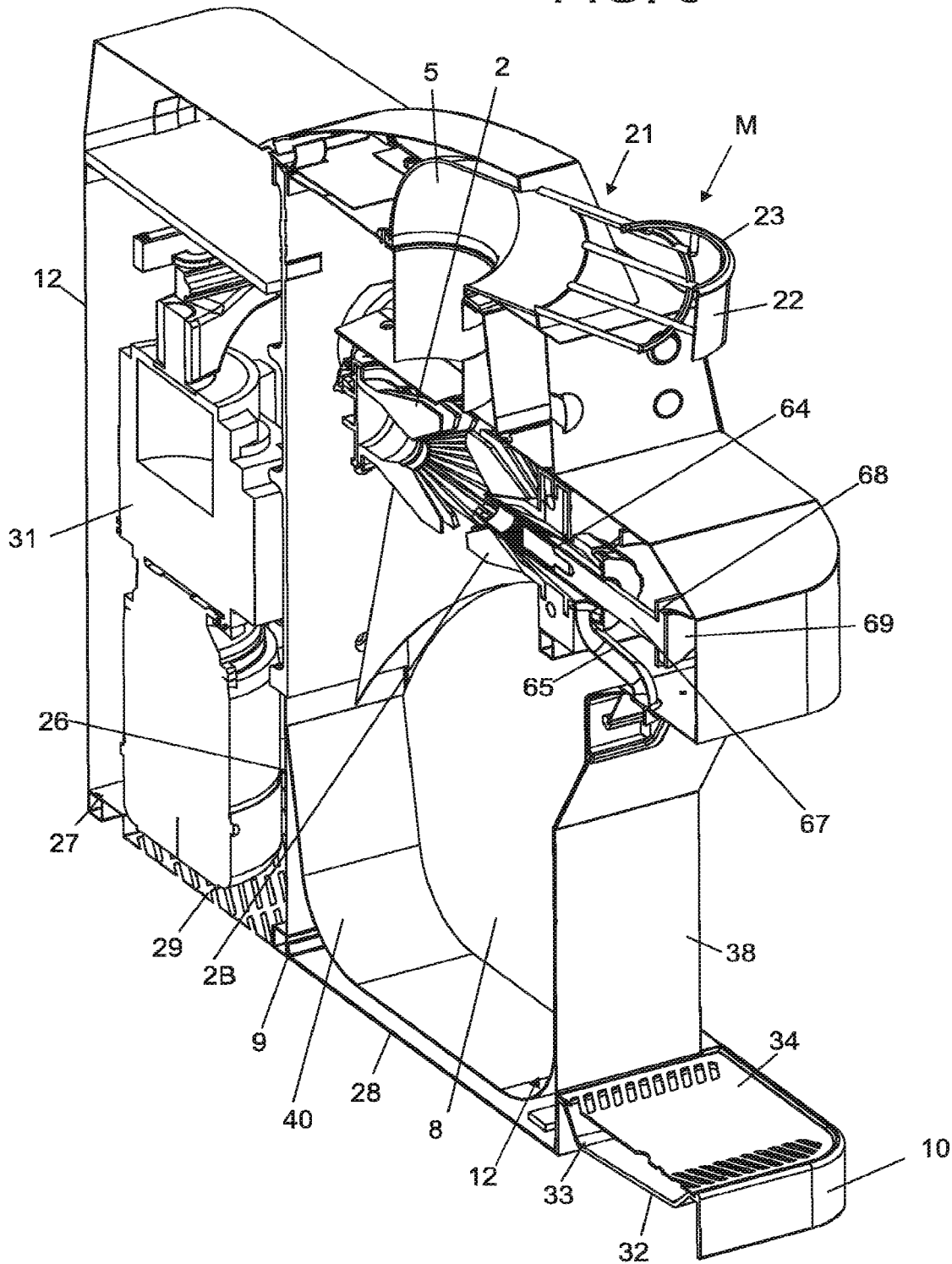
FIG. 6: Longitudinal cross-section perspective view of the machine.
Figure 7:
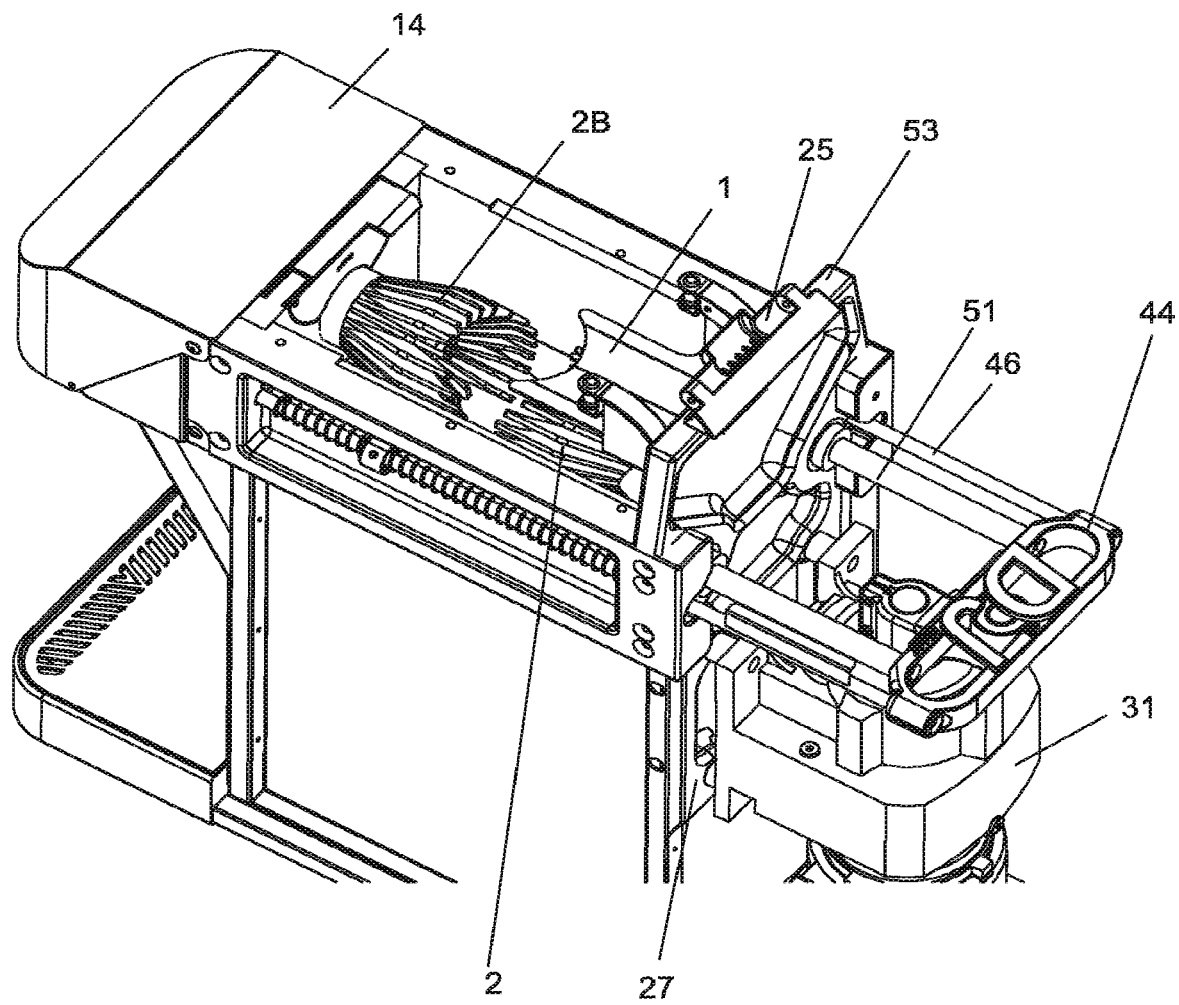
FIG. 7: Top perspective view of the machine without the cowling, showing the peelers moving towards each other.
Figure 8:
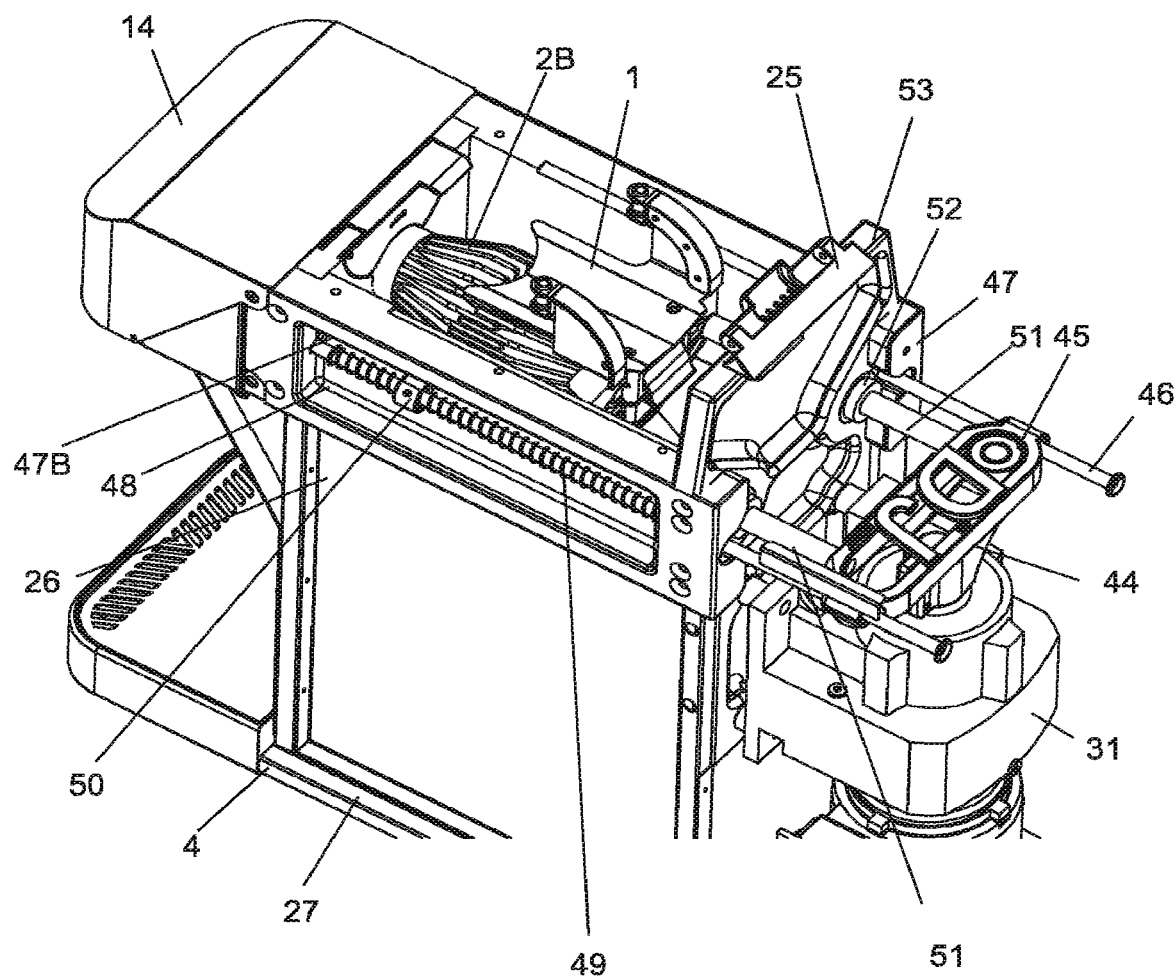
FIG. 8: Top perspective view of the machine without the cowling, showing the peelers starting to engage with each other.
Figure 9:
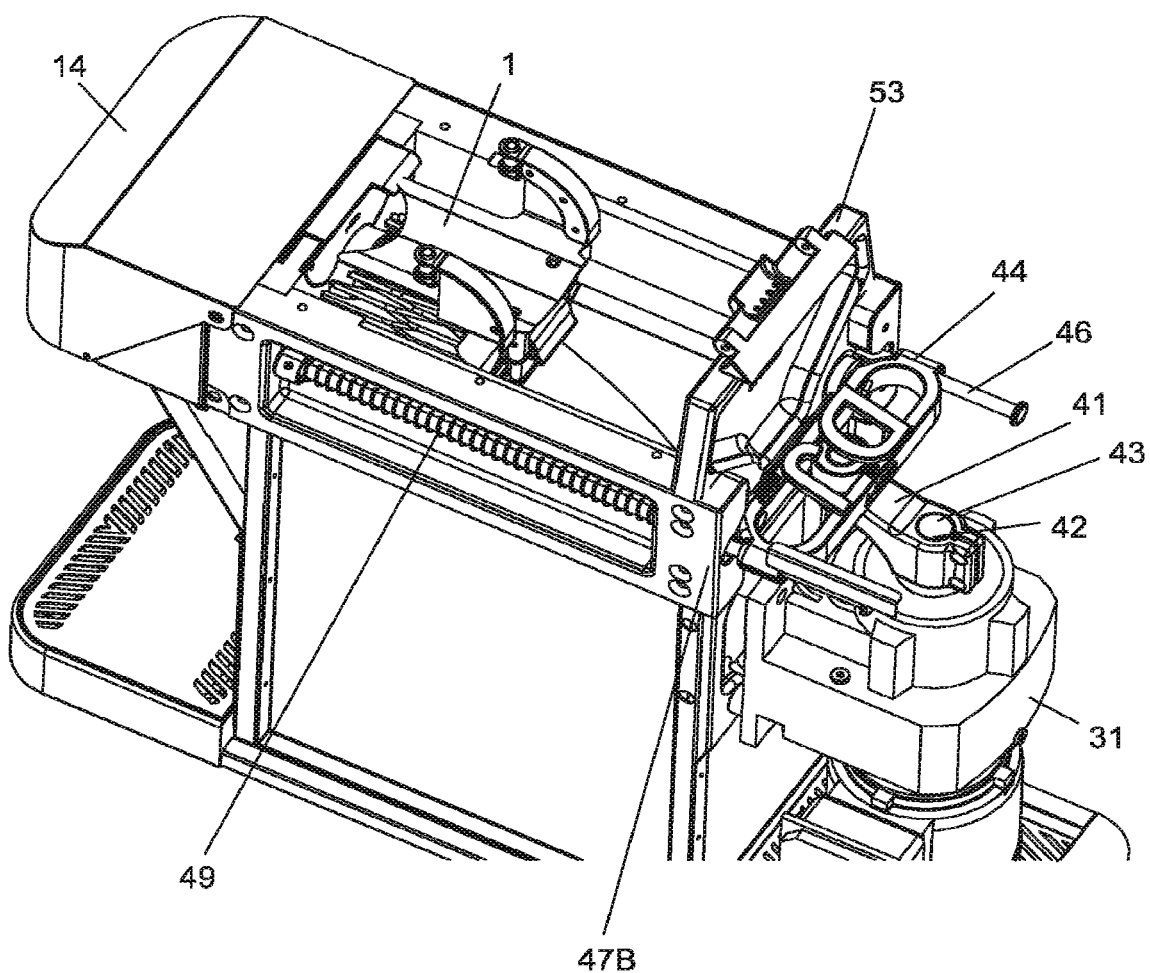
FIG. 9: Top perspective view of the machine without the cowling, showing the peelers fully engaged with each other.
Figure 10:
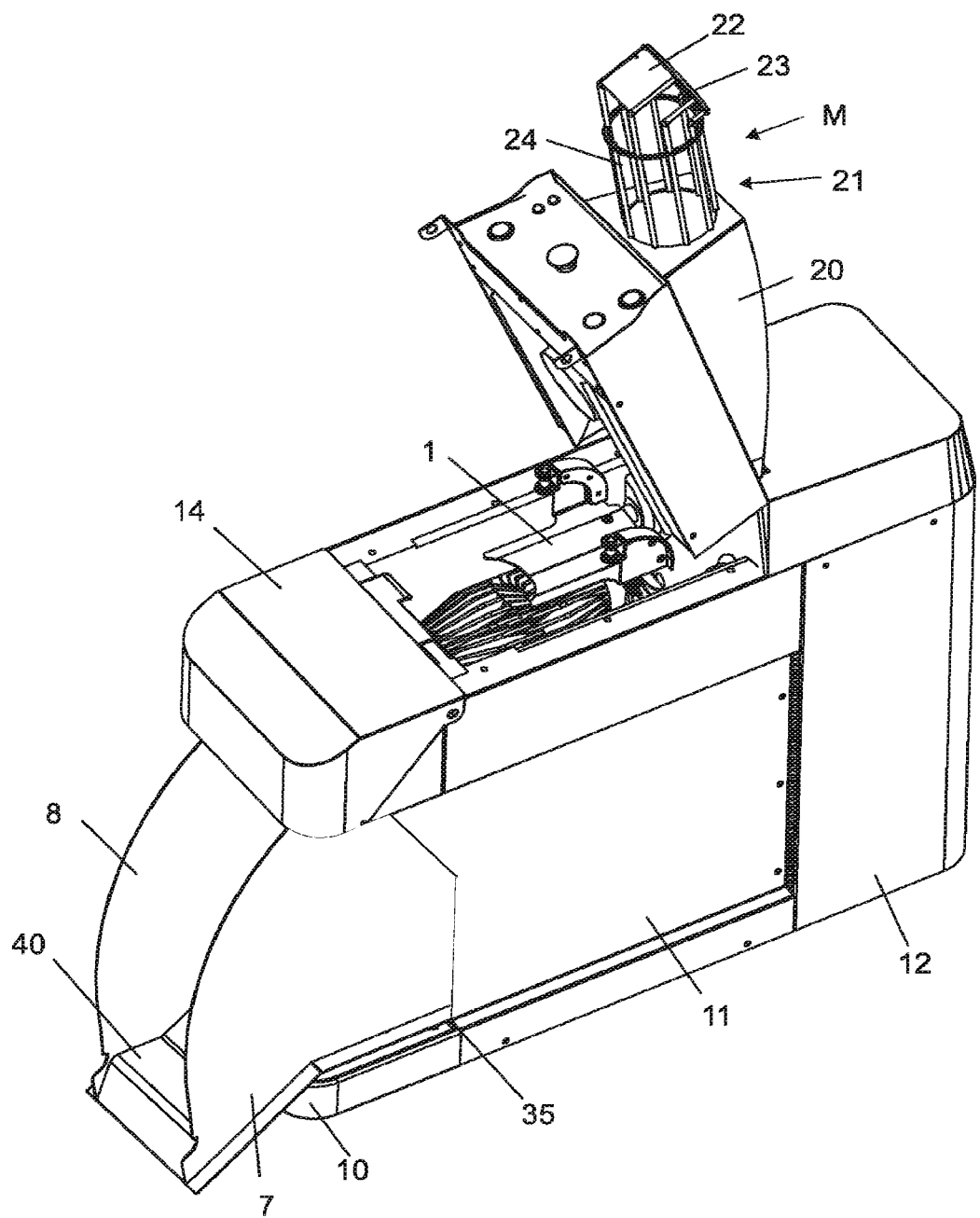
FIG. 10: Perspective view of the machine with the fruit-rack sub-set in the open position.
Figure 18:
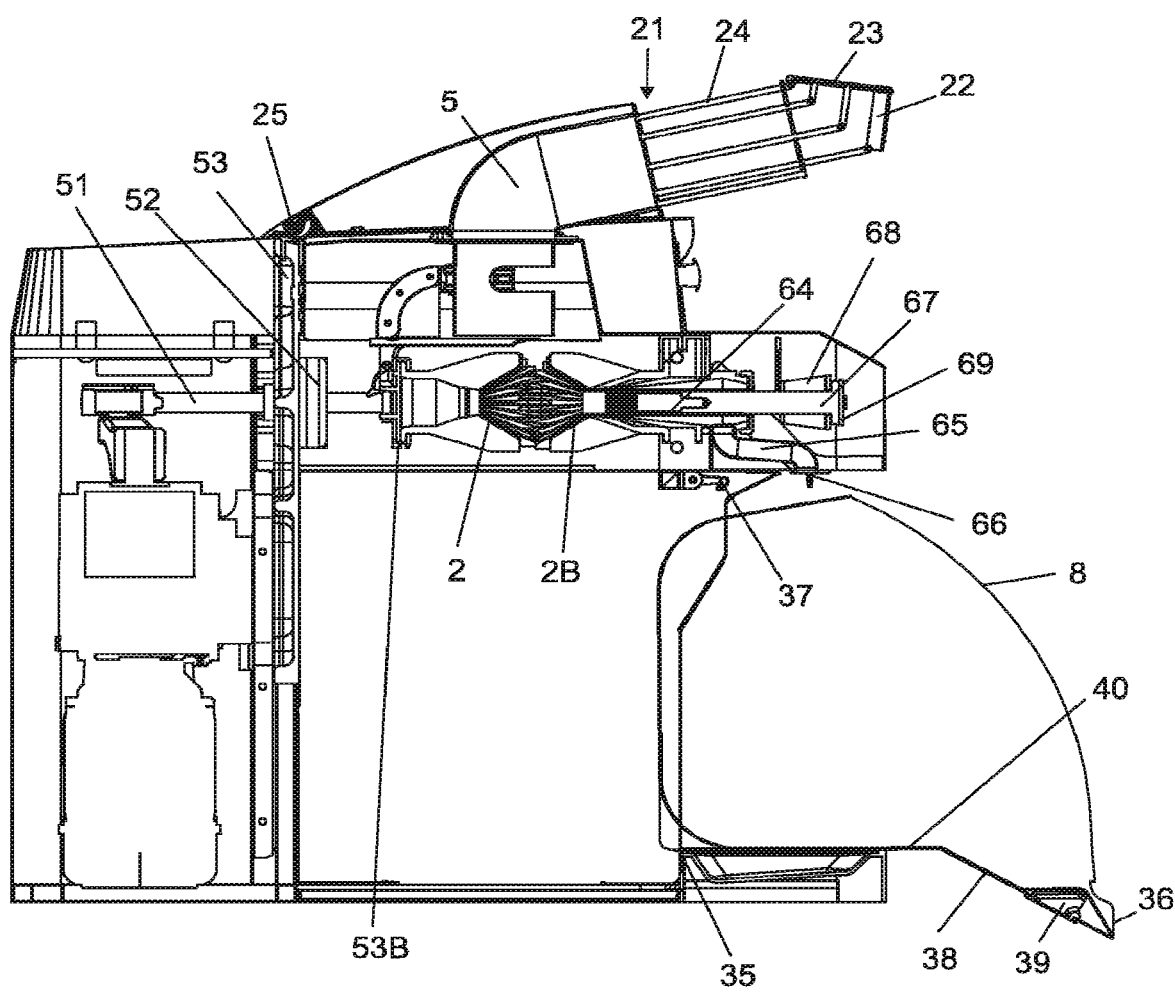
FIG. 18: Front view of the machine with partial cross-sections near the dispenser/feeder sub-set, fruit-rack and swing-lidded waste-bin in the open position.

The IMPROVEMENTS TO A JUICE EXTRACTION MACHINE addressed by this application for a patent of Invention are improvements to a juice extraction machine (M), comprising a fruit-rack sub-set (1) with a curved cross-section whose movement is synchronized with the mobile peeler rotating axle (2), with such fruit-rack (1) being attached to the mobile peeler sub-set (2) through slots (3), with the machine including a cross-spring (4) attached at the bottom of the feeder/dispenser pipe (5), with such cross-spring (4) having a means of activation (51) located on the fruit-rack sub-set (1); the improved machine (M) comprises a swing-lidded waste-bin (7) in front, with such swing-lidded waste-bin (7) having substantially semi-circular sides (8) close to the mobile (2) and fixed peelers (2B) that are aligned with each other, with the latter being concatenate with the filter and piston sub-set (67) mounted inside the fixed peeler (2B) (FIGS. 6, 7 and 18).

Figure 1:
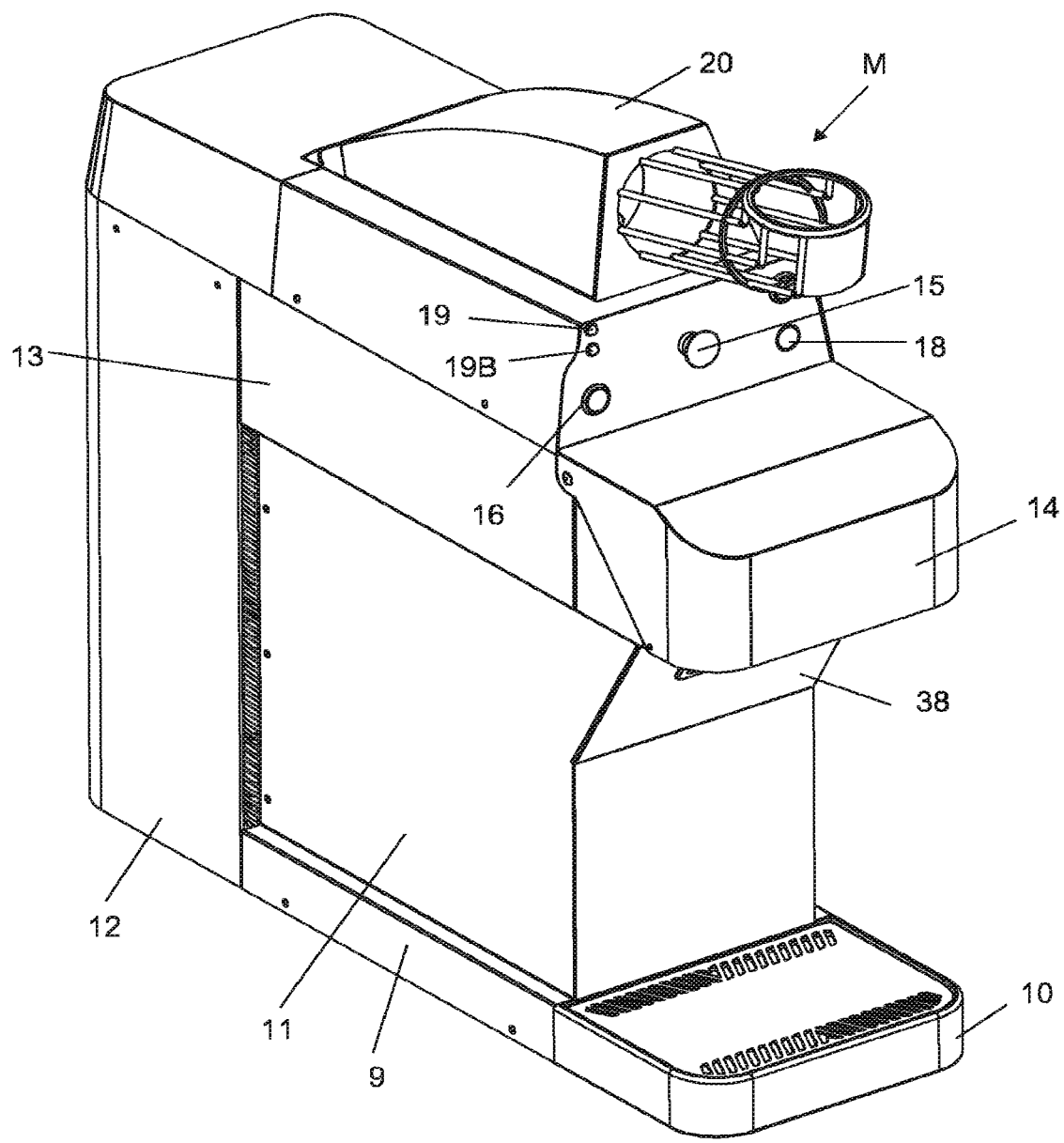
FIG. 1: Front perspective view of the machine.
Figure 2:
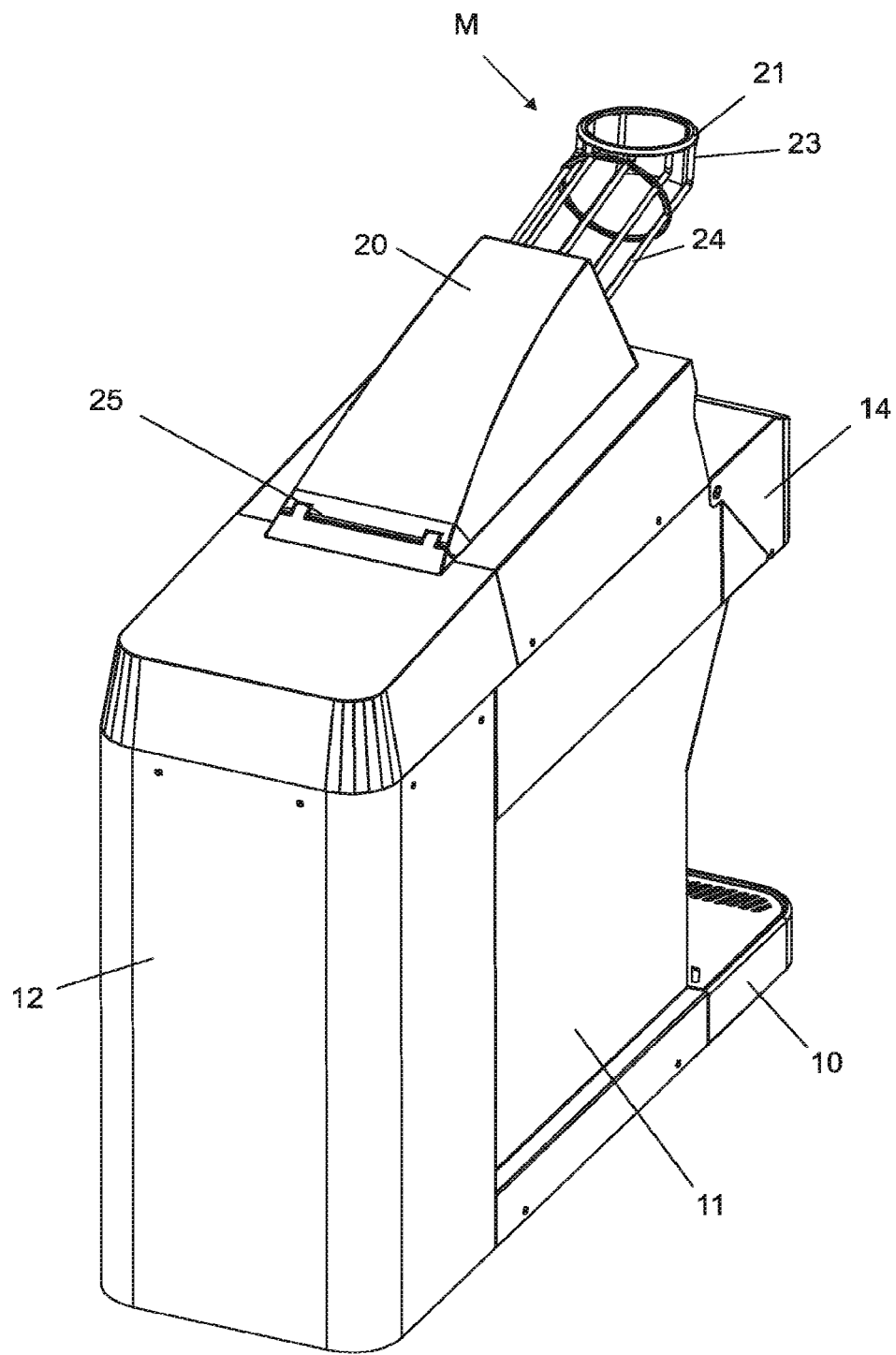
FIG. 2: Rear perspective view of the machine.
Figure 3:
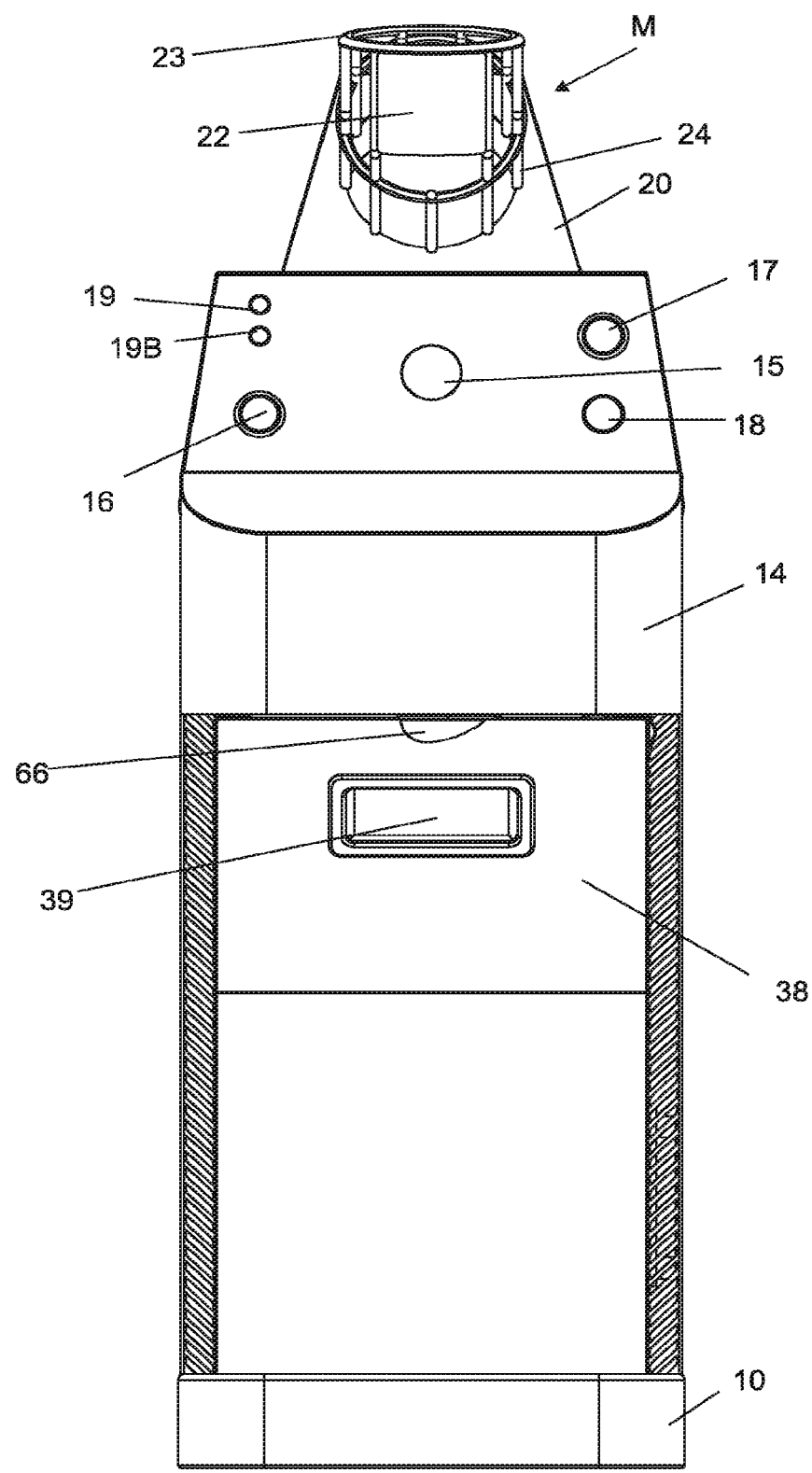
FIG. 3: Front view of the machine.
Figure 4:
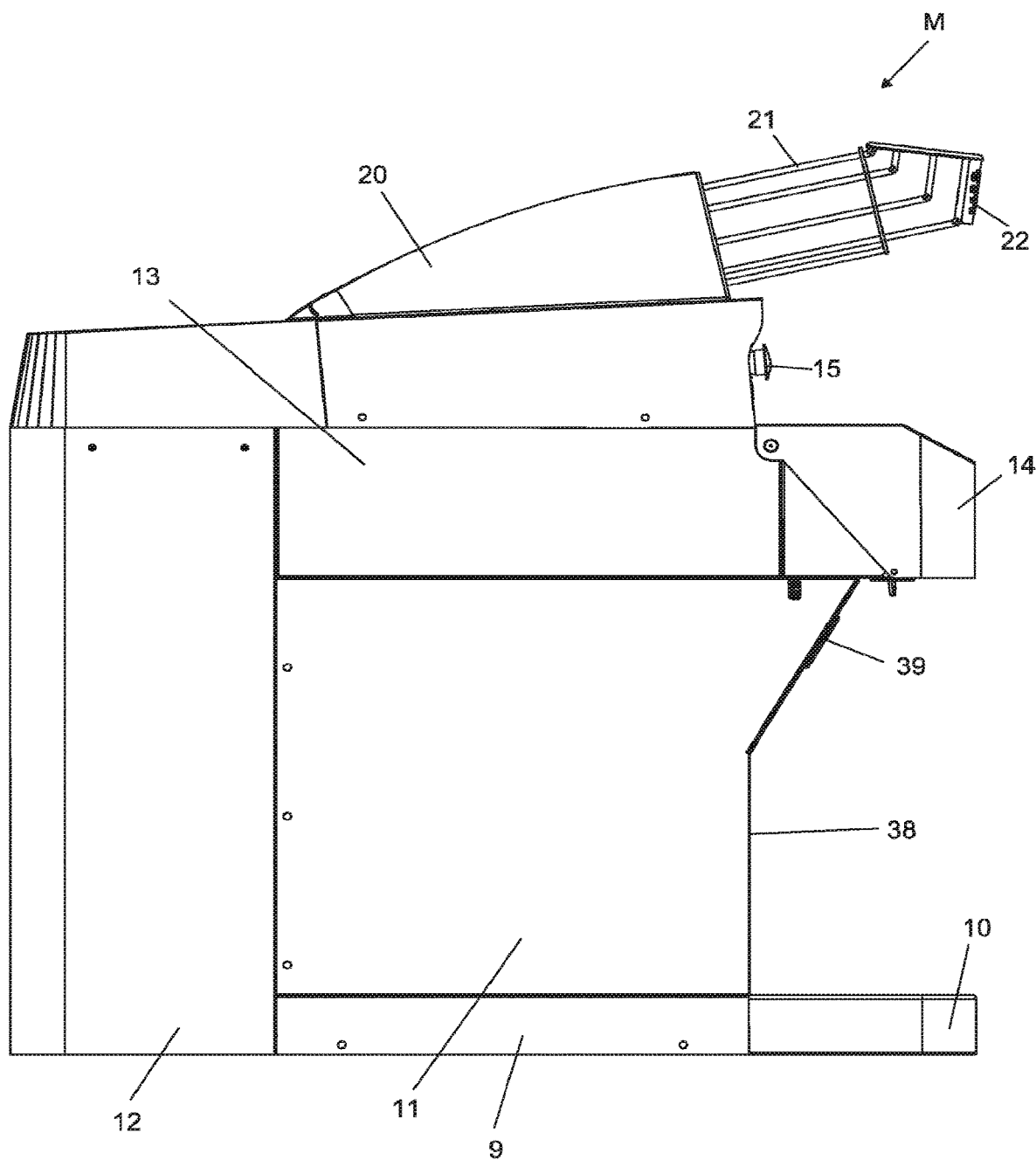
FIG. 4: Side view of the machine.
Figure 5:
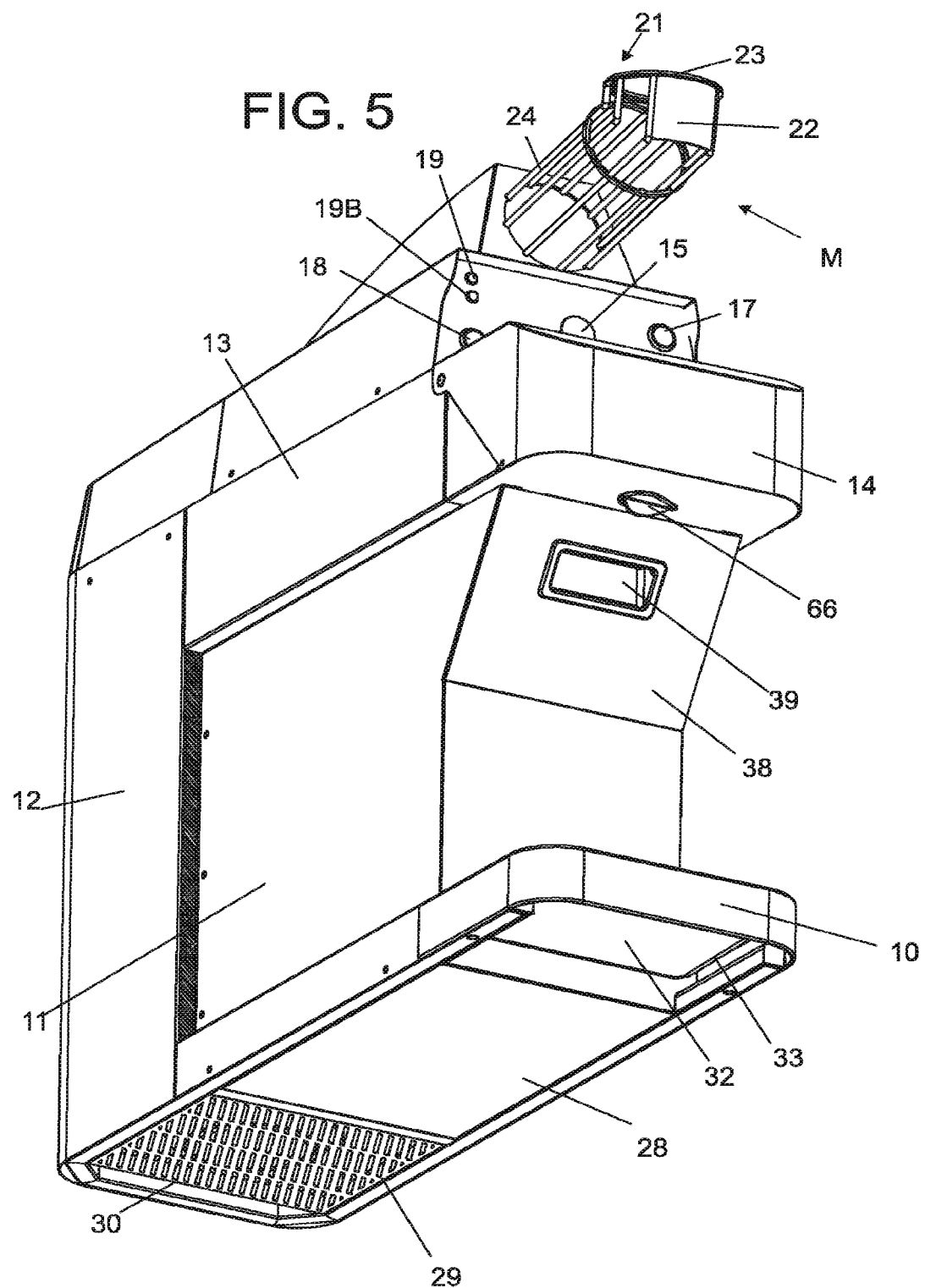
FIG. 5: Bottom front perspective view of the machine.

In a preferred and compact construction, the machine (M) presents a flat and level support base (9) that is rectangular in the version presented here, whose bottom front part holds a drip tray (10), as well as flat vertical side-cowlings (11), rear vertical cowlings (12), top cowlings (13) that form a top front surface (14) holding the operating buttons or displays, one of which is an emergency button (15), a general switch (16), an on-switch (17), an off-switch (18), and LED indicator lights (19) for peels (19B) and open (FIGS. 1, 2 and 5).

Just above the surface (14) is a cowling (20) with a fruit funnel (21), fitted at the front with a sizer element (22) that controls the maximum and minimum sizes for fruit entering such funnel (21), consisting of a wire element that communicates with the feeder/dispenser (5) in the machine, with this funnel having an inflow rim (23) and a cylindrical wire conduit (24) projecting into the machine at a slight slant that is sufficient to allow the fruit to move forward through gravity. The electro-electronic part of the machine is a commonplace solution not addressed by this protection, with the components listed for clarification purposes and allowing a person skilled in the matter to reproduce the product, with a market solution (FIGS. 1, 2, 3, 6, 18, 19, 20 and 21).

The rear part of the top cowling (20) has a linking mechanism (25) that moves it into the open or closed position, as the inside consists of a metal structure made from rectangular sheeting sections (26) on the sides that are supported on the bottom metal frame (27) of the support base (9), with the latter holding the sheet metal sections (28), with the rear sections (29) being pierced (30) in order to provide a means of ventilation for the gear-motor sub-set (31) that powers the mobile peeler (2) and fruit-rack (1), while the front section is a solid metal sheet (32) with curved edges (33) attached to the sheet metal structure (26), such solid metal sheet (32) topped by a thin metal sheet with front slots (34), above which are the pivot points (35) of the swing-lidded waste-bin (7) whose sides are approximately semicircular (8), with such waste-bin having a flange projecting from its transversal rim (36) with a spring-pin locking device (37) that keeps it latched in the closed position, while the front metal sheet (38) is fitted with a handle (39) made from plastic or some similar material (FIGS. 4, 5, 6, 18, 19 and 23).

The front metal sheet (38) has a convex (inverted slant) surface whereby when the swing-lidded waste-bin (7) is in the open position, it forms a sloping surface (40) that allows easier waste removal and cleaning (FIGS. 10, 17, 18 and 19).

In the rear part of the machine is the gear-motor sub-set (31), which is in turn attached to the sheet metal sections base affixed to the structure (27) of the metal base (9) and the rectangular metal sheet sections structure (26), being held thereto by screws or other conventional means of attachment (FIGS. 6 and 7).

Projecting from the top end of the gear-motor sub-set (31) is a crank arm (41) whose pivoting end (42) is connected to an axle (43) with a pulley (45) that in turn runs through a guide (44) across the machine, with such guide (44) having grooves at the opposite ends to hold he opposing cylindrical axles (46) running through the metal sheet side guides (47) and with the guide (44) supported on the front edges (47B) of the structural part of the machine, with such metal sheet side guides (47) having rectangular dips (48) where the spiral springs work (49) with plastic stoppers (50), whose extended linear movements are limited by the rectangular dips (48), thus defining the maximum movement of the above-mentioned plastic stoppers (50), through converting the rotating movement of the crank arm (41) into the linear movement of the guide (44). The opposing parallel axles (51) of the mobile peeler (2) are attached to the guide (44), with such opposing parallel axles (51) being fully attached to the guide (44) and running through the structure of the machine on bushings (52) incorporated into the structural metal sheet (53), and with such opposing parallel axles (51) extending to the opposite sides of the mobile peeler (2), where they are attached to the diamond-shaped base (53B) in order to endow the latter with alternating linear to-and-fro movements (FIGS. 8, 9, 18 and 19).

This substantially diamond-shaped base (53B) has opposing vertices along the length of the diamond with holes (54) through which the above-mentioned axles run (51); with such base providing the vertical housings (55) that hold the slots (3) of the fruit-rack sub-set (1), with the latter comprising a base/support (56) with a concave curve (57) whose radius is larger than that of the fruit (F) that it will hold, with substantially "C"-shaped arms (58) projecting on both opposite sides from the rear part of such fruit-rack, with internal reinforcement elements (59) whose tips are fitted with substantially "U"-shaped supports that hold axles with pulleys (60) activating the spiral cross-spring (4) that releases or holds the fruit (F) during the operating stages of the machine (M) (FIGS. 11, 12, 13, 14 and 15).

Figure 11:
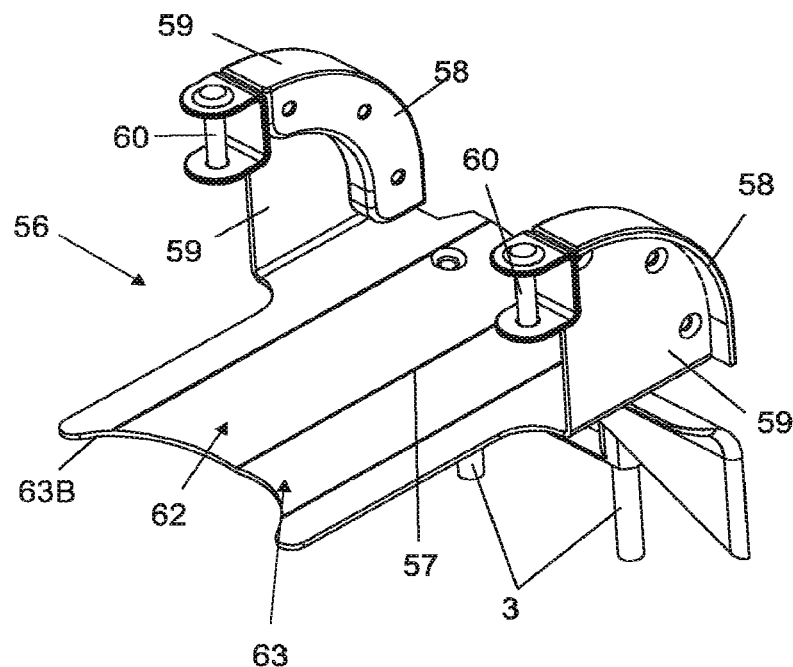
FIG. 11: Perspective view of the fruit-rack.
Figure 12:
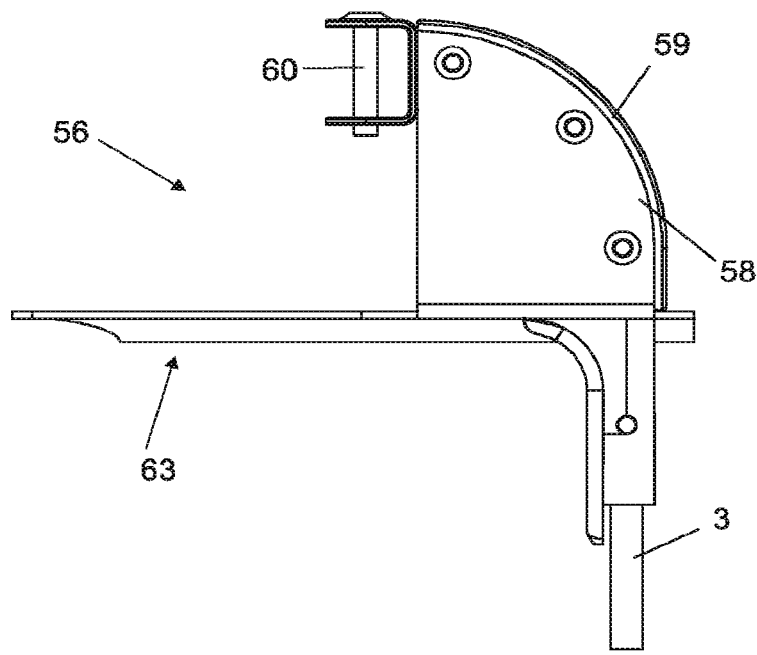
FIG. 12: Side view of the fruit-rack.
Figure 13:
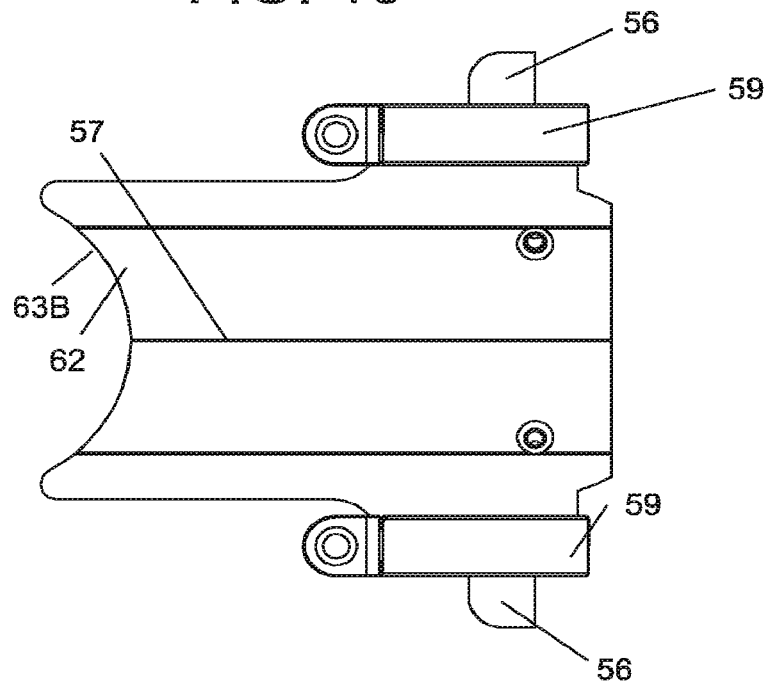
FIG. 13: Top view of the fruit-rack.
Figure 14:
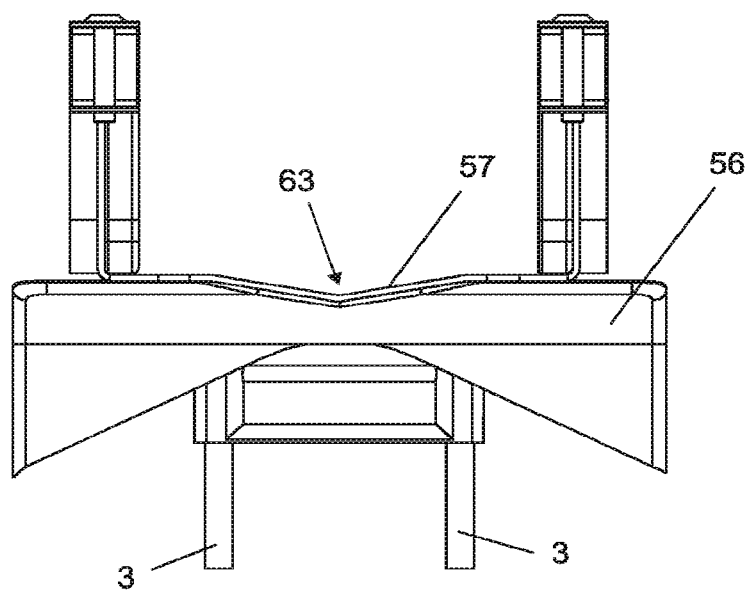
FIG. 14: Front view of the fruit-rack.
Figure 15:
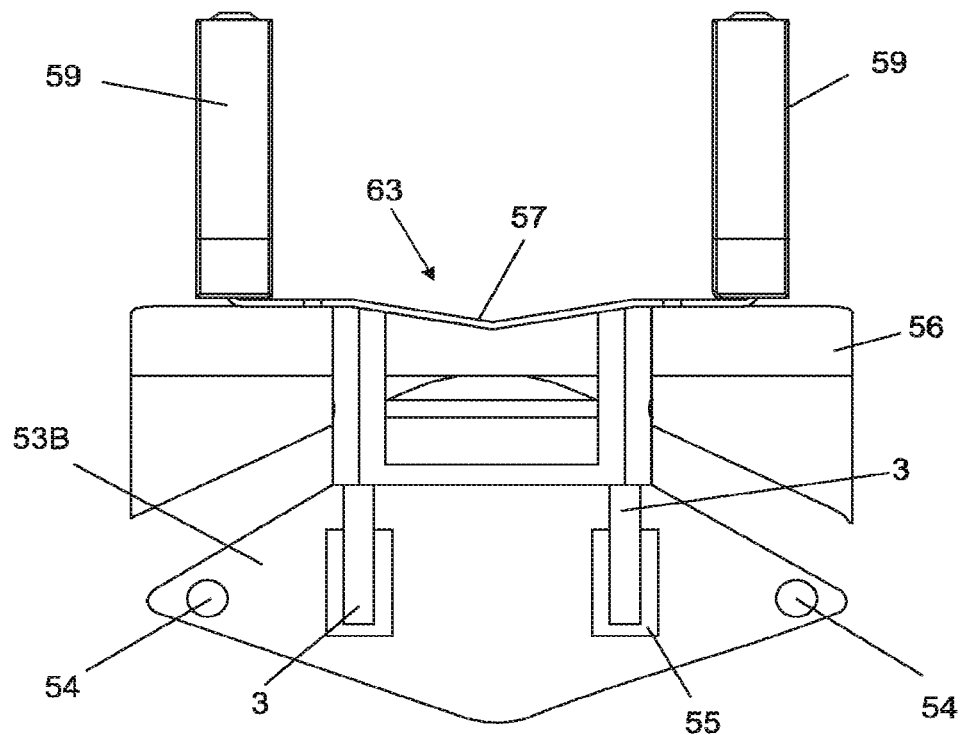
FIG. 15: Rear view of the fruit-rack.
Figure 16:
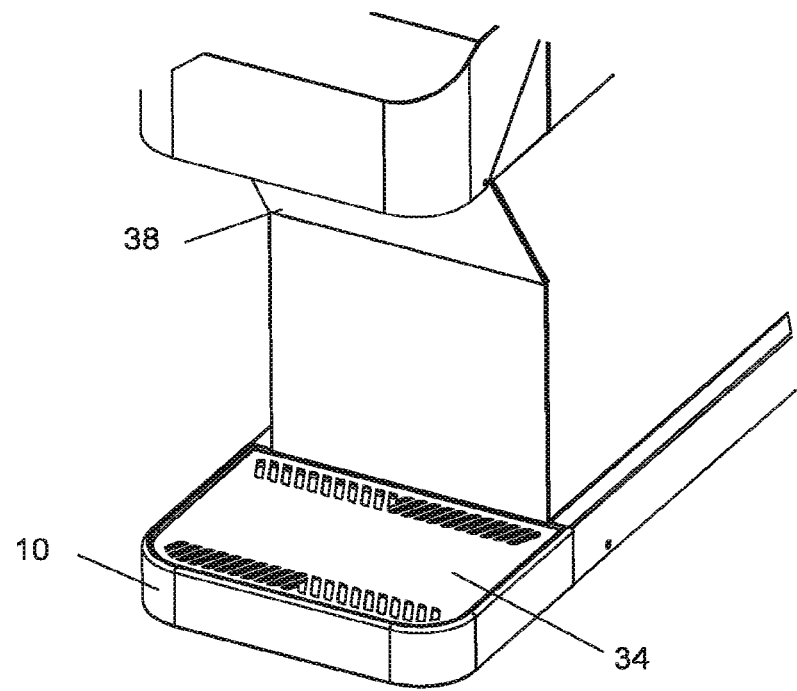
FIG. 16: Perspective view of the swing-lidded waste-bin separated from the machine, in the closed use position.
Figure 17:
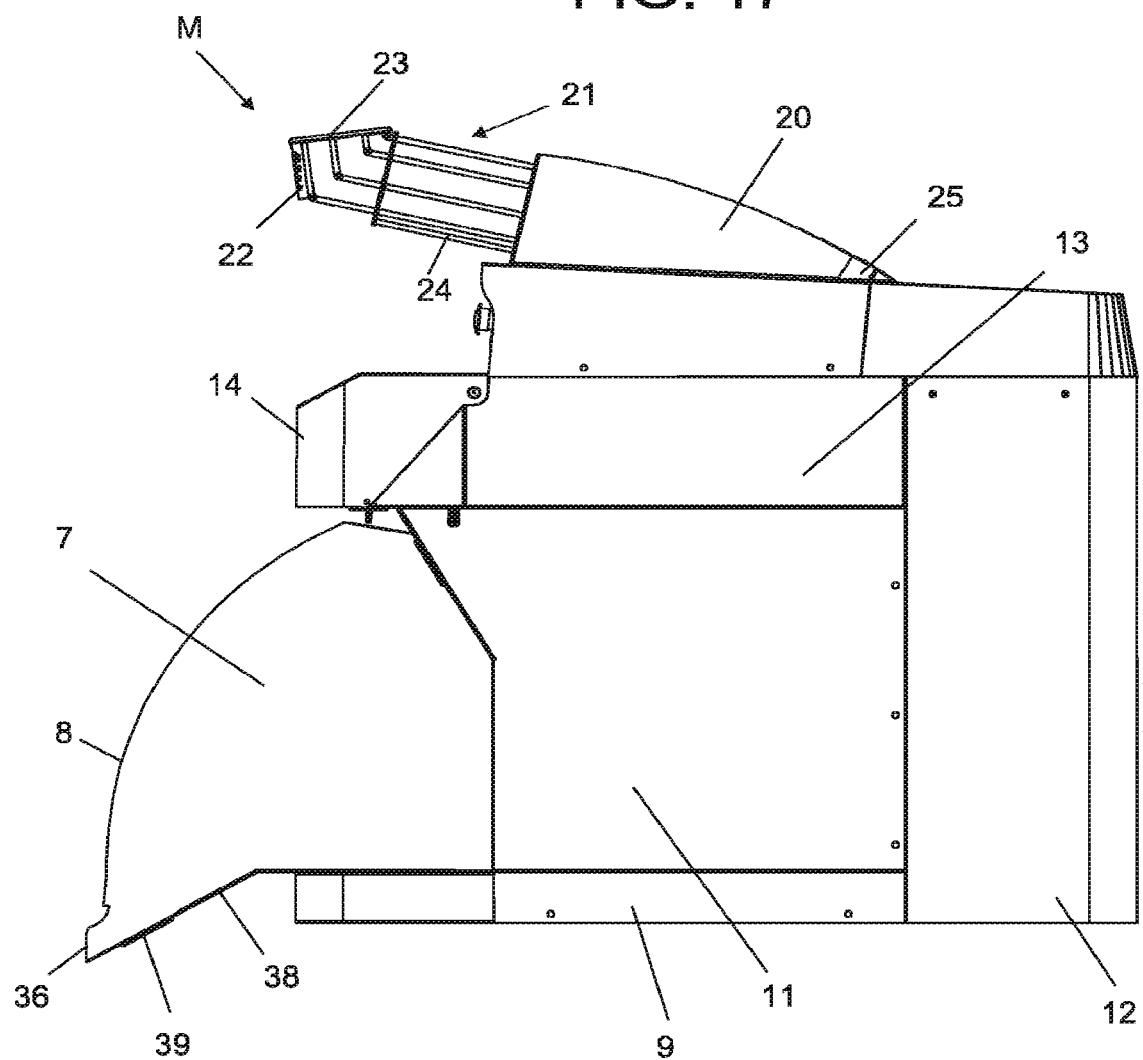
FIG. 17: Side view of the swing-lidded waste-bin separated from the machine, in the open use position.
Figure 20:
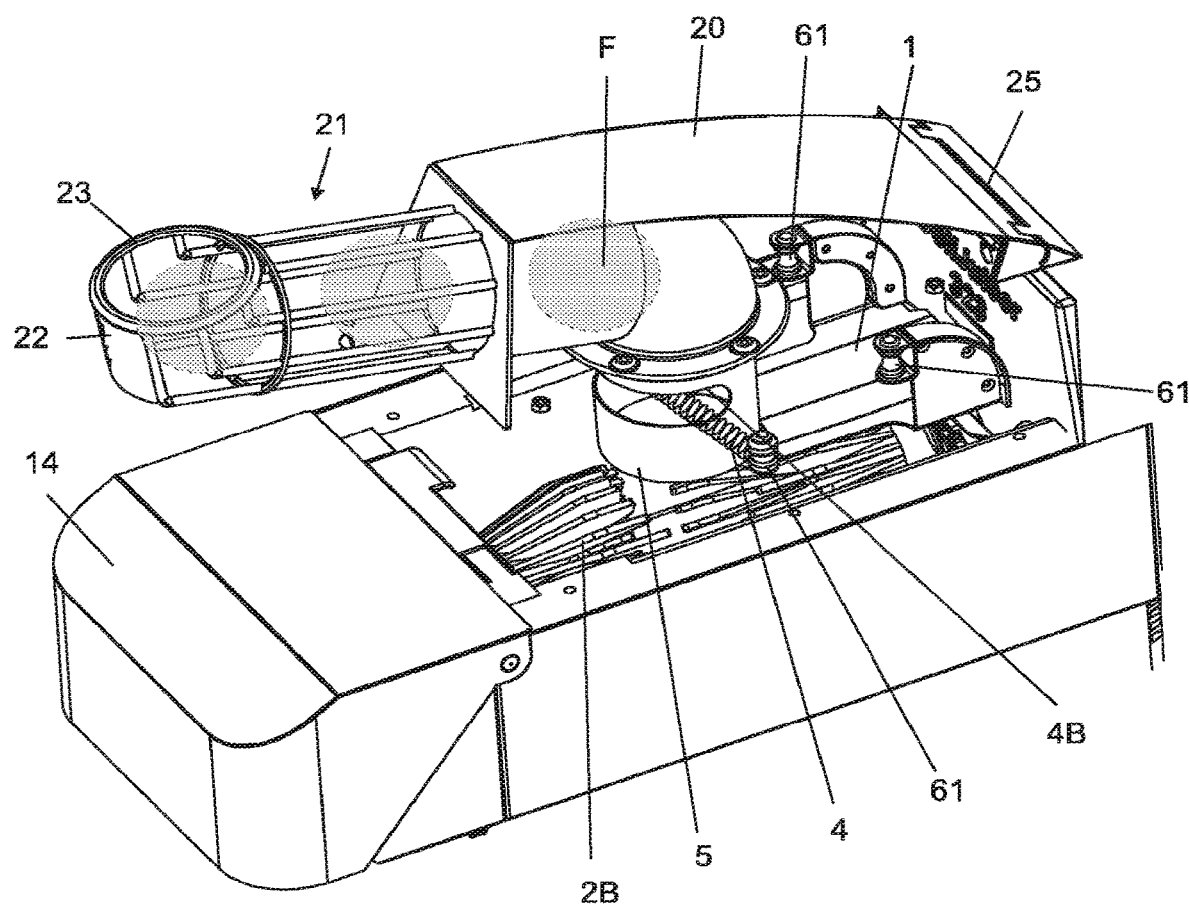
FIG. 20: Partial top side cross-section view of the machine with the upper cowling closed and the mobile peeler in the first stage starting position.
Figure 21:
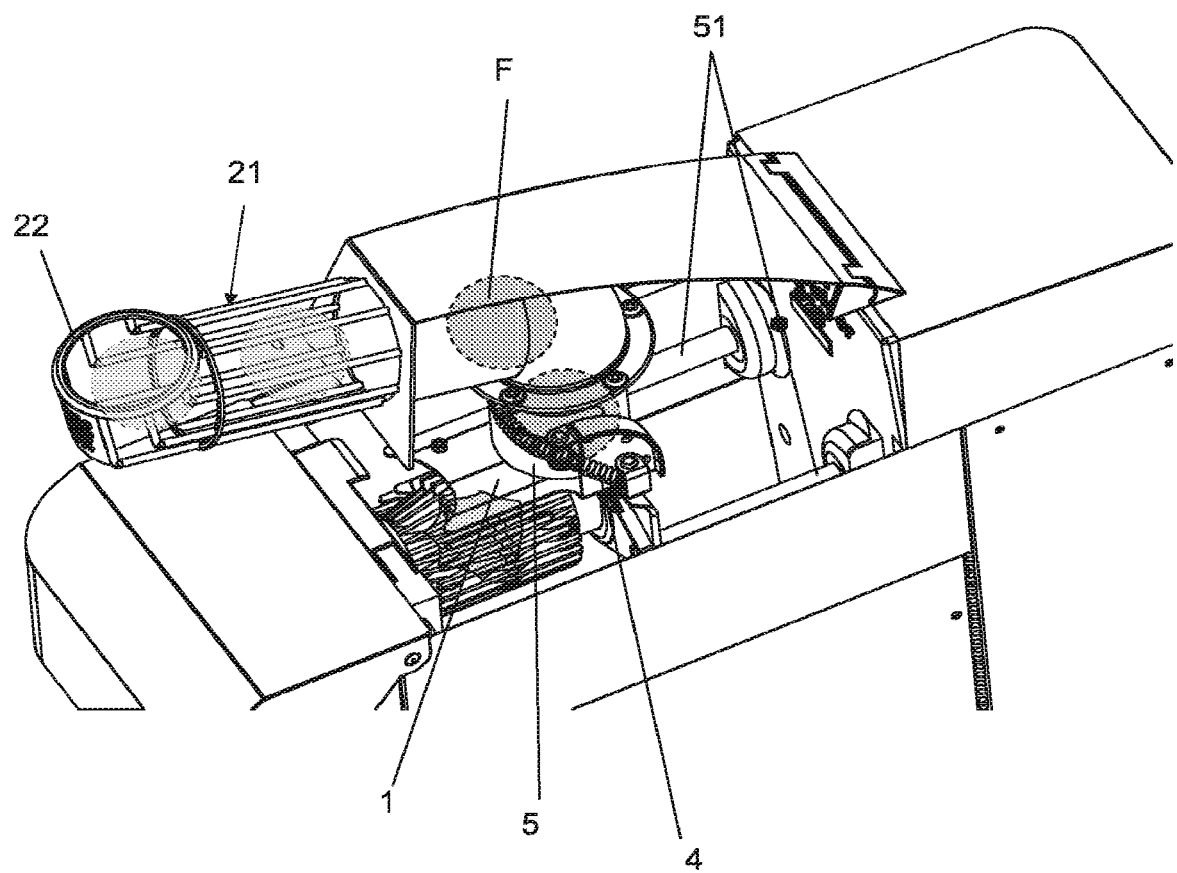
FIG. 21: Partial top side cross-section view of the machine with the upper cowling closed and the mobile peeler in the third stage, removing the peel from the fruit and almost simultaneously extracting its juice.
Figure 22:
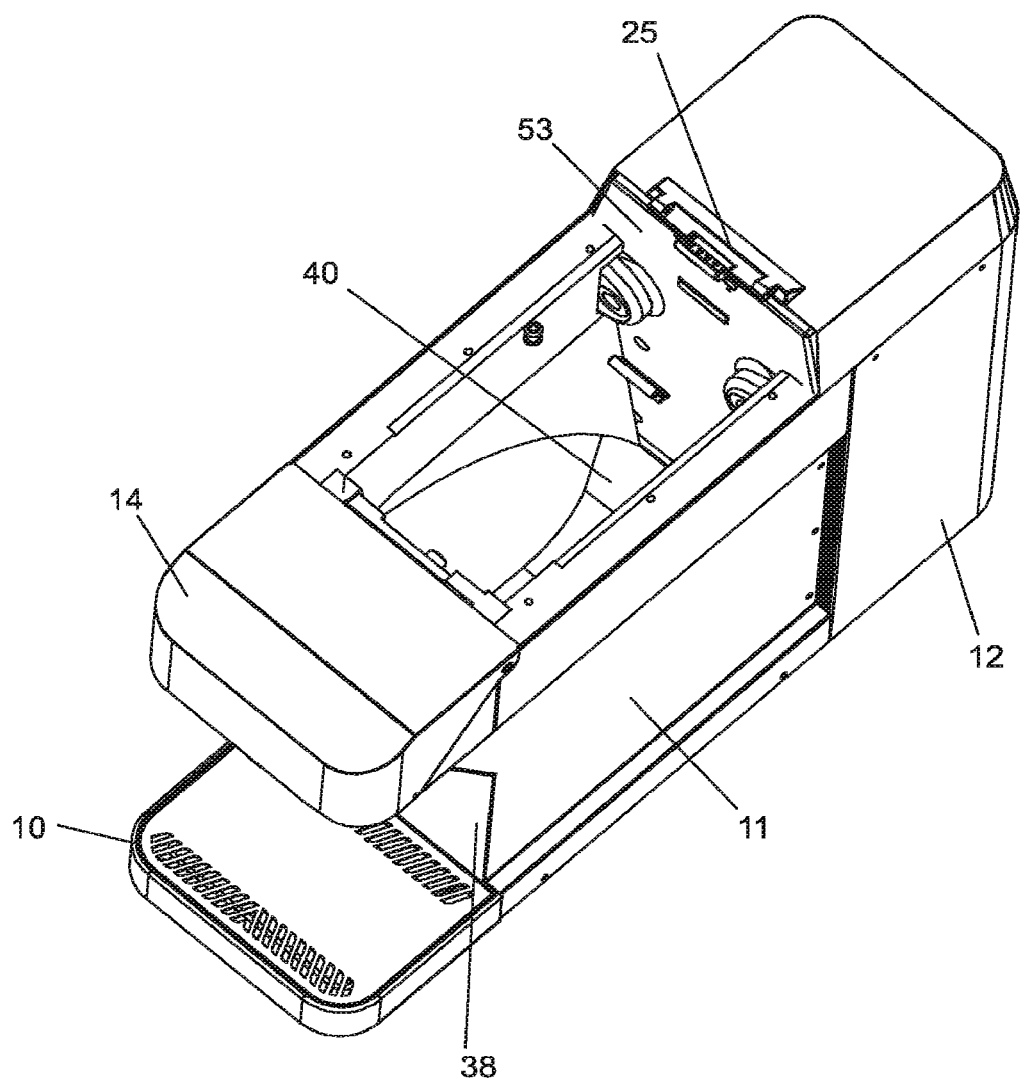
FIG. 22: Top front perspective view of the structural cowling and hinges of the machine.
Figure 23:
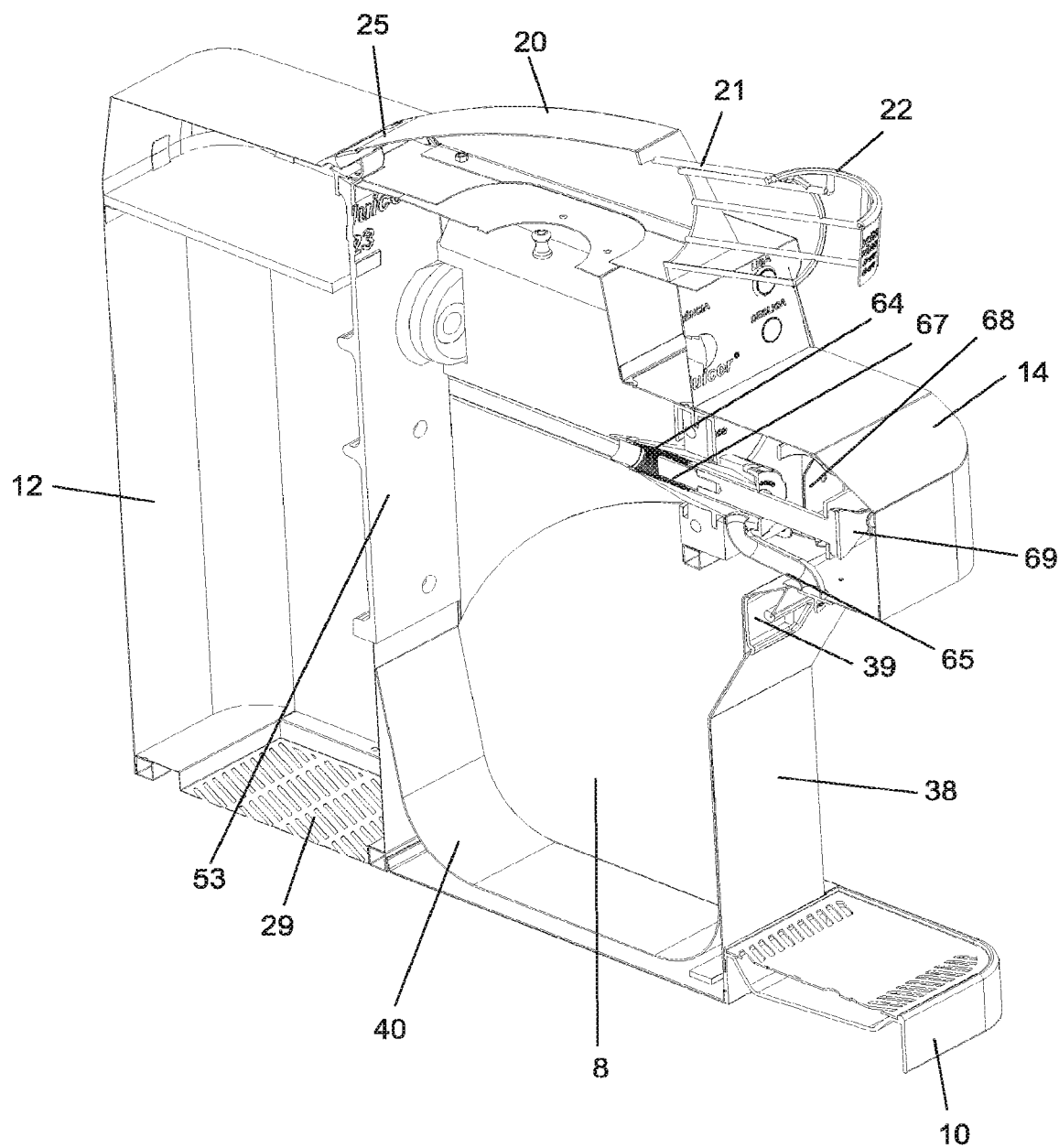
FIG. 23: Rear perspective view of the structural cowling and hinges of the machine, with details of the filter and piston sub-set and a cross-section view of the swing-lidded waste-bin.

When moved in a linear direction, the substantially "C"-shaped arms (58) with the pulleys (60), alongside the mobile peeler sub-set (2) reach the cross-spring (4) that runs through the axial cross-section (4B) of the feeder/dispenser (5), with such cross-spring (4) supported by the parallel pulleys (61) attached to the sides of the machine casing, releasing the fruit (F) that drops by gravity on to the cradle base/support (56); such cradle base/support (56) consists of a smooth surface (62) with an elongated cross-section whose center (63) is lowered slightly into a "V"-shape that forms a curve (57) preventing damage to the fruit (F) and allowing it to slip down easily; on the top part of the smooth surface (62) is a rounded cut-out (63B) whose linear movement either holds the fruit back or releases it into the next stage (FIGS. 11, 20 and 21).

Figure 19:
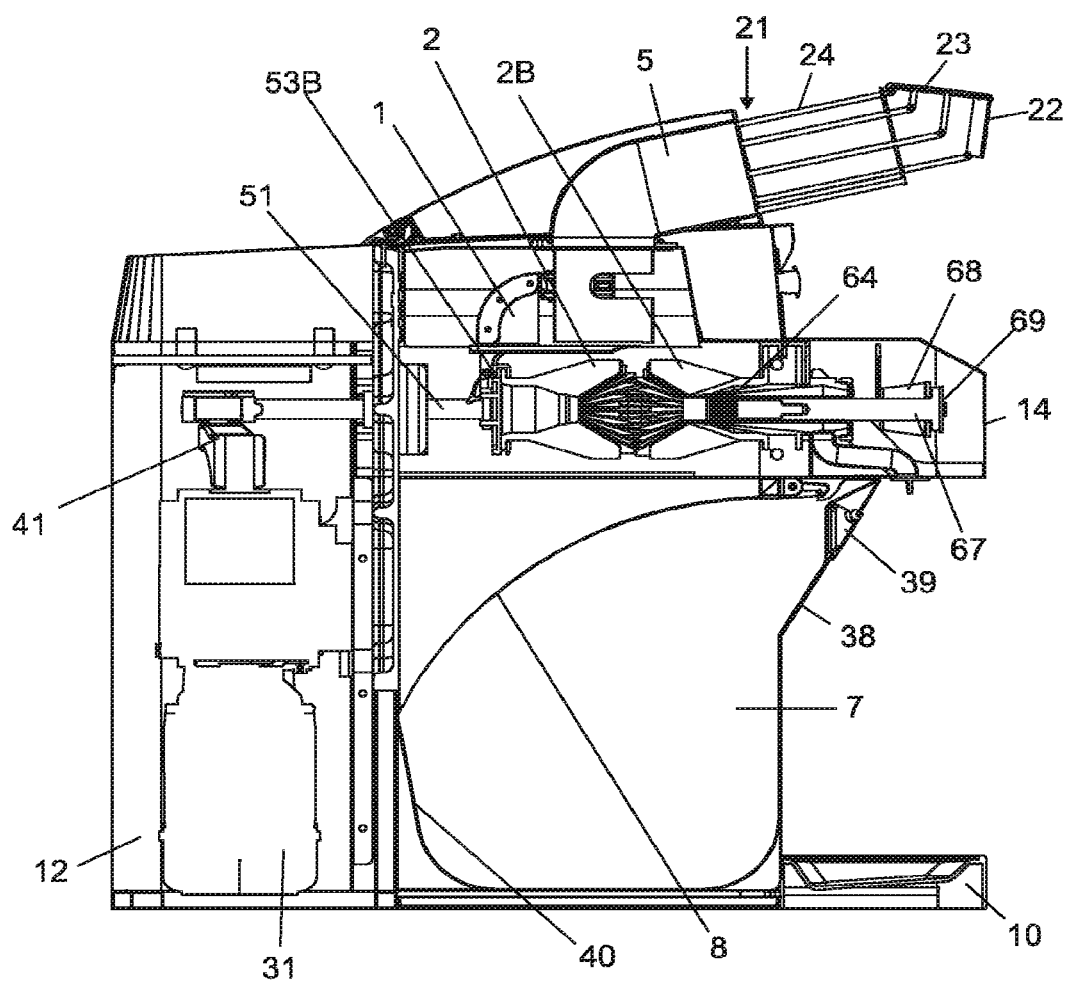
FIG. 19: Front view of the machine with partial cross-sections near the dispenser/feeder sub-set, fruit-rack and swing-lidded waste-bin in the closed position.

The filter (64) mounted on the front part of the machine (M) communicates with the inner part of the fixed peeler (2B) and the "S"-shaped pipe (65) in order to release liquid through the activation device (66). The filter and piston sub-set (67) is attached to the machine (M) by a cross-blade (68) affixed to the axles (46) by conventional means and with a front lid (69) that may be removed when necessary (FIGS. 6, 18 and 19).

According to the invention, with this new machine (M) the fruit (F) runs through three stages, all synchronized by the movement of the mobile peeler (2). In the first stage, the fruit (F) lies on a cross-spring (4) in the feeder/dispenser (5); in the second stage, the fruit (F) falls on to the fruit-rack (1) through the contact action in the activation device releasing the cross-spring (4) during the linear movement of the mobile peeler (2) towards the fixed peeler (2B), being kept above the mobile peeler (2) by the action of the cross-spring (4); in the third stage, the fruit (F) falls between the fixed (2B) and mobile peelers (2) that extract the juice. With each new cycle and with the feeder/dispenser (5) full, one fruit (F) drops at each stage.

Most of the components used in the construction of the machine (M) are metal, using stainless steels almost exclusively and conventional manufacturing means such as welds and screws, among others. The other non-metal components are normally food-grade polymers, with the means of processing being analogously compatible with market technologies.

The invention claimed is:

1. A juice extraction machine comprising:
    front and rear portions including a support base having a flat and level orientation during operation, the rear portion comprising a gear-motor assembly;
    first and second peeler cups, extending between the front and rear portions, for extracting juice from a fruit item, the second peeler cup connected to the gear-motor assembly for powered movement;
    a fruit dispenser positioned for gravity feed delivery of the fruit item to the peeler cups, and where the second peeler cup is coupled to the gear-motor assembly via a rotatable axle that effects the powered movement of the second peeler cup;
    a fruit rack disposed between the fruit dispenser and the peeler cups, the fruit-rack including a top surface for receiving the fruit item from the fruit dispenser, a portion of the fruit-rack top surface including an edge over which the fruit item is releasable from the top surface to fall toward the peeler cups, wherein the second peeler cup is moveable, with respect to the first peeler cup, to undergo linear displacements in two opposite directions, wherein movement of the fruit rack is synchronized with movement of the rotatable axle; and
    a swing lidded waste-bin positioned along the front portion of the machine and comprising a swing lid including a metal sheet mounted for movement about pivot points, and which swings out and down, which swing lid, when closed, is close to the peeler cups and, when open, allows for removal of wastes such as pith, pulp, peel and/or core, wherein: with the swing lid metal sheet positioned along the front portion, the pivot points of the swing lid are positioned along the metal sheet, where, when the swing-lidded waste-bin is in the open position, at least a portion of the metal sheet includes a downward sloping surface with respect to the flat, level support base.

2. The juice extraction machine of claim 1 wherein, during juice extraction, the wastes are discharged into the swing lidded waste-bin while liquid flows from one of the peeler cups.

3. The juice extraction machine of claim 1 where the swing-lidded waste-bin includes side walls positioned close to the peeler cups when closed, this allowing waste pith, pulp and peel removal when open.

4. A juice extraction machine comprising:

front and rear portions including a support base having a flat and level orientation during operation, the rear portion comprising a gear-motor assembly;

first and second peeler cups, extending between the front and rear portions, for extracting juice from a fruit item, the second peeler cup connected to the gear-motor assembly for powered movement;

a fruit dispenser positioned for gravity feed delivery of the fruit item to the peeler cups, and where the second peeler cup is coupled to the gear-motor assembly via a rotatable axle that effects the powered movement of the second peeler cup;

a fruit rack disposed between the fruit dispenser and the peeler cups, the fruit-rack including a top surface for receiving the fruit item from the fruit dispenser, a portion of the fruit-rack top surface including an edge over which the fruit item is releasable from the top surface to fall toward the peeler cups, wherein the second peeler cup is moveable, with respect to the first peeler cup, to undergo linear displacements in two opposite directions, wherein movement of the fruit rack is synchronized with movement of the rotatable axle; and a swing lidded waste-bin configured for integration with the machine when positioned along the front portion and comprising a swing lid mounted for movement about pivot points and which swings out and down, so that, when the swing lid is closed, walls of the waste bin can be positioned sufficiently close to the peeler cups to directly receive waste, such as pith, pulp, peel or core, as the waste is being discharged from the peeler cups, wherein:

(i) with the swing lid positioned along the front portion, the pivot points are positioned along the swing lid, and (ii) (ii) when the swing-lidded waste-bin is in the open position, at least a portion of the swing lid includes a downward sloping surface with respect to the flat, level support base.

* * * * *